(12) United States Patent
Basson et al.

(10) Patent No.: US 6,712,692 B2
(45) Date of Patent: Mar. 30, 2004

(54) USING EXISTING VIDEOGAMES FOR PHYSICAL TRAINING AND REHABILITATION

(75) Inventors: Sara H. Basson, White Plains, NY (US); Peter Gustav Fairweather, Yorktown Heights, NY (US); Alexander Faisman, Ridgefield, CT (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 10/039,962

(22) Filed: Jan. 3, 2002

(65) Prior Publication Data

US 2003/0125099 A1 Jul. 3, 2003

(51) Int. Cl.[7] .................................................. A63F 13/00
(52) U.S. Cl. ................. 463/7; 463/36; 463/8; 434/258; 482/8
(58) Field of Search ............................. 463/1–9, 36–40; 273/317, 440, 440.1; 482/8–9, 900–902; 434/247–258

(56) References Cited

U.S. PATENT DOCUMENTS

| | | | | |
|---|---|---|---|---|
| 5,616,078 A | * | 4/1997 | Oh | 463/8 |
| 6,164,973 A | * | 12/2000 | Macri et al. | 463/3 |

* cited by examiner

*Primary Examiner*—Mark Sager
*Assistant Examiner*—Aaron Capron
(74) *Attorney, Agent, or Firm*—Ryan, Mason & Lewis, LLP; Louis J. Percello (57) ABSTRACT

Information is gathered about movements of a person, which could be an adult or child. This information is mapped to one or more game controller commands. The game controller commands are coupled to a videogame, and the videogame responds to the game controller commands as it would normally.

18 Claims, 6 Drawing Sheets

USING EXISTING VIDEOGAMES FOR PHYSICAL TRAINING AND REHABILITATION

FIELD OF THE INVENTION

The present invention relates to electronic interfaces and, more particularly, relates to using existing videogames for physical training and rehabilitation.

BACKGROUND OF THE INVENTION

It is well known that adults and, especially, children get bored repeating the same movements. This can be problematic when an adult or a child has to exercise certain muscles during a post-trauma rehabilitation period. For example, special exercises are typically required after a person breaks his or her arm. It is hard to make this repetitive work interesting. Existing methods to help people during rehabilitation include games to encourage people, and especially children, to exercise more. For instance, a game between a physical therapist and a child might involve the child gently throwing light weights into a "strike zone." Another game could have the child standing on a small trampoline and hopping on one leg to imitate a rabbit. However, it is difficult to create a game for each of the many suggested exercises for each muscle group.

Thus, what is needed are techniques to make repetitive physical exercises more entertaining.

SUMMARY OF THE INVENTION

The present invention provides techniques for using existing videogames for physical training and rehabilitation. Information is gathered about movements of a person, which could be an adult or child. This information is mapped to one or more game controller commands. The game controller commands are coupled to a videogame, and the videogame responds to the game controller commands as it would normally.

In one aspect of the present invention, a videogame interface is a separate computer system from the computer system executing the videogame. The videogame interface accepts input from sensors attached to the person, from a video camera that captures the movements of the person, or from both. Movements are determined from video or sensor data, and the movements are assigned to groups. One or more important groups of data are assigned to a class. The class is associated with one or more game controller commands and the game controller commands are provided to the videogame. In another aspect of the invention, one computer system both runs the videogame and creates the game controller commands from movement.

An advantage of the present invention is that the person, in particular a child, can be trained to perform a certain movement. This movement is used, for example, to help rehabilitate an injury. Each time the movement is performed, the movement will be converted into one or more game controller commands. The game controller commands cause particular actions to be taken by a videogame. Through an appropriate selection of videogames, a physical therapist or trainer can make therapy or training much more enjoyable for the person, while also providing adequate therapy or training for the particular area being rehabilitated or exercised.

A more complete understanding of the present invention, as well as further features and advantages of the present invention, will be obtained by reference to the following detailed description and drawings.

DETAILED DESCRIPTION OF THE EMBODIMENTS

Figure 1:
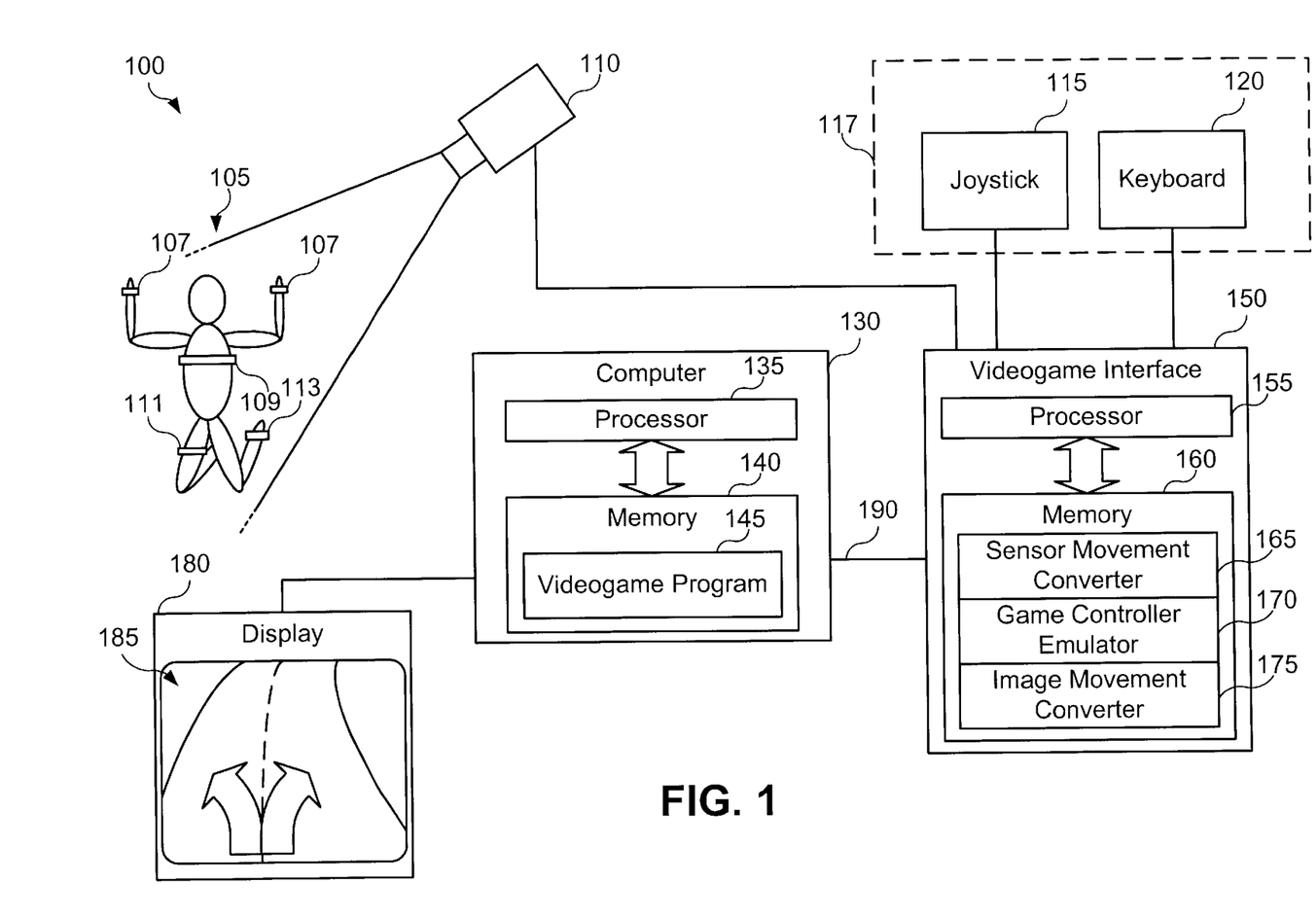
FIGS. 1 and 2 illustrate exemplary systems for using existing videogames for physical training and rehabilitation, in accordance with embodiments of the present invention.

Turning now to FIG. 1, an exemplary system 100 is shown for using existing videogames for physical training and rehabilitation, in accordance with embodiments of the present invention. System 100 illustrates one aspect of the invention, where a computer system, called a "videogame interface" herein, acts as a standalone system that interfaces game controllers with a computer system executing a videogame. System 100 interacts with a child 105 and comprises a camera 110, a joystick 115, a keyboard 120, a videogame interface 150, a computer 130, and a display 180. Joystick 115 and keyboard 120 are exemplary game controllers 117. Computer 130 comprises a processor 135 and a memory 140, which comprises videogame program 145. Videogame interface 150 comprises a processor 155 and a memory 160. In memory 160, there is a sensor movement converter 165, a game controller emulator 170, and an image movement converter 175.

Child 105 has a number of sensors on him or her. Sensors 107, 111, and 113 sense position or movement or both, and sensor 109 senses heart rate. These sensors can be analog or digital or a combination of these. For instance, gloves are commonly used to capture hand movements, and these gloves are usually wired directly to a computer system such as videogame interface 150. Additional sensors and techniques for using them are discussed below. These sensors can be connected to videogame interface 150 through wires and appropriate interfaces (not shown) or through wireless systems and appropriate wireless interfaces. Display 180 is currently displaying the output 185 of a videogame.

The videogame interface 150 generally operates in two modes. In one mode, commands from the game controllers 117 (e.g., joystick 115 and keyboard 120) pass unchanged through the videogame interface 150. It should be noted that the "commands" from joystick 115 and keyboard 120 can be signals and the word "commands" should be interpreted to encompass digital or analog signals. In another mode, the videogame interface 150 gathers information about movements of a person and converts these movements into game controller commands (in this example, joystick commands, keyboard commands, or both). Additionally, although only joystick 115 and keyboard 120 are shown, those skilled in the art will realize that there are many different game controllers 117 that can be emulated, such as mice, track balls, game pads, and steering wheels. Joystick 115 and keyboard 120 are used as examples of possible game controllers 117 solely for the sake of simplicity.

Information about the movements is collected from sensors 107, 109, 111, and 113 or from camera 110 or from both of these. The joystick 115 or keyboard 120 commands are sent over connection 190 to videogame program 145, which interprets the commands and acts on them. In the example of FIG. 1, connection 190 is a device suitable for communicating both joystick and keyboard commands to computer system 130. For instance, the connection 190 could be a Universal Serial Bus (USB) cable or Firewire (also known by the Institute of Electronic and Electrical Engineers Standard 1394). Optionally, separate cables for each of the joystick 115 and keyboard 120 can be provided.

Based on movement information from sensors 107, 109, 111, and 113 or on from video on camera 110, the videogame interface 150 will create appropriate commands suitable for controlling videogame program 145. The sensor movement converter 165 and image movement converter 175 are discussed in more detail below. Briefly, each converter 165, 175 takes an input and determines classes of movement from the input. The game controller emulator 170 maps the classes into game controller 117 commands (e.g., joystick 115 or keyboard 120 commands). Optionally, each converter 165, 175 can create basic commands (such as "move right" or "move up") and the game controller emulator 170 converts the basic commands to actual game controller (e.g., joystick 115 or keyboard 120) commands.

In the example of FIG. 1, the videogame program 145 is an automobile racing program that has an output 185 showing a road. The arrows indicate possible directions for an automobile that the actions of the child 105 will cause the automobile to take. Although not shown in the figure, speech may be increased or decreased by appropriate movements of the child 105.

The two modes for videogame interface 150 discussed above are not necessarily exclusive. For instance, it is possible that the keyboard may be used to activate and deactivate a menu associated with the game. Such a menu could, illustratively, be used to stop the game or advance it to the next level, while movements of child 105 are being interpreted by the videogame interface 150 and converted into game controller commands.

Figure 2:
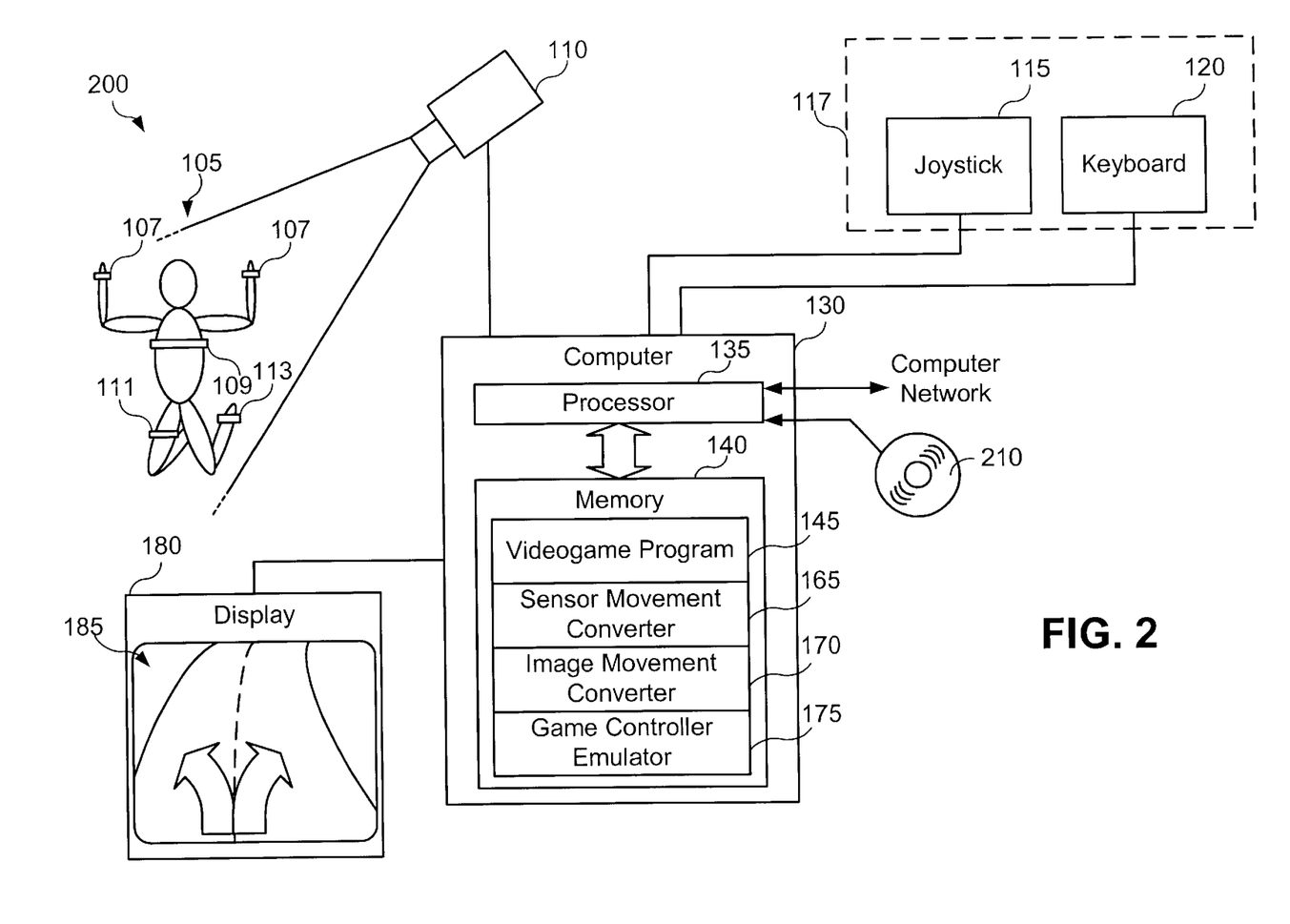

Referring now to FIG. 2, a system 200 is shown that allows existing videogames to be used for physical training and rehabilitation, in accordance with one embodiment of the present invention. In this embodiment, a single computer system is used to interpret movement, create game controller commands, and execute a videogame. Also in this exemplary embodiment, memory 140 of computer 130 comprises videogame program 145, as before. Additionally, memory 140 comprises sensor movement converter 165, image movement converter 170, and game controller emulator 175.

Game controller emulator 175 again converts classes or, optionally, simple movement commands into game controller commands. However, because the game controller emulator 175 is inside computer system 130, the emulator 175 has a number of options for how the emulator couples the game controller commands to the videogame program 145. For example, operating systems (not shown) commonly have drivers (not shown) for joystick 115 and keyboard 120. Usually, the game controllers (e.g., joystick 115 and keyboard 120) are connected to some input device (not shown) and the input device itself generally has a buffer (not shown). Additionally, some operating systems contain software buffers (not shown) in addition to the hardware buffers. The game controller emulator 175 could modify these drivers to accept commands not only from the buffers but from the game controller emulator 175. As another example, the game controller emulator 175 could send game controller commands directly to the videogame program 145. Those skilled in the art will realize that there are additional techniques that can be used to send game controller commands to the videogame program 145. Which technique is chosen is a design choice that depends on the operating system and other factors known to those skilled in the art.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 210.

Memory 140, 160 of computer system 130 and videogame interface 150 will configure its respective processor 135, 155 to implement the methods, steps, and functions disclosed herein. The memory 140, 160 could be distributed or local and the processor 135, 155 could be distributed or singular. The memory 140, 160 could be implemented as an electrical, magnetic or optical memory, or any combination of these or other types of storage devices. Moreover, the term "memory" should be construed broadly enough to encompass any information able to be read from or written to an address in the addressable space accessed by processor 135, 155. With this definition, information on a network is still within memory 140, 160 because the processor 135, 155 can retrieve the information from the network. It should be noted that each distributed processor that makes up processor 135, 155 will generally contain its own addressable memory space. It should also be noted that some of all of computer system 130 or videogame interface 150 can be incorporated into an application-specific or general-use integrated circuit.

Figure 3:
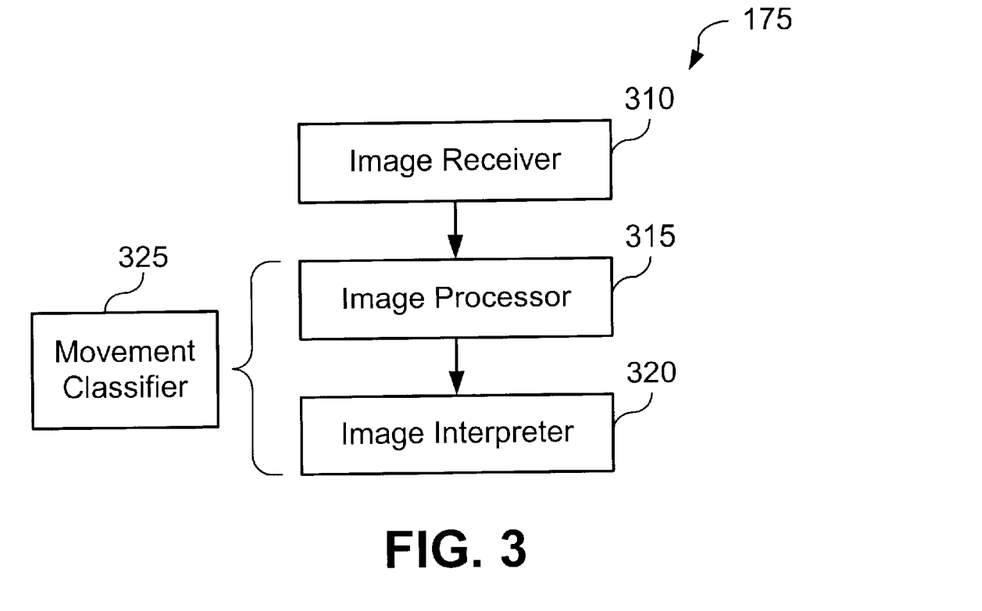
FIG. 3 shows a block diagram of an exemplary image movement converter, in accordance with one embodiment of the present invention.

Referring now to FIG. 3, a block diagram of an exemplary image movement converter 175 is shown, in accordance with one embodiment of the present invention. Image movement converter 175 accepts video (not shown) of a person performing movements and creates, from the video, classes of movements (not shown). These classes of movements can then be converted to game controller commands, which are coupled to a videogame to control the videogame.

Image movement converter 175 comprises an image receiver 310, an image processor 315, and an image interpreter 320. Image processor 315 and image interpreter 320 are one embodiment of a movement classifier 325. Movement classifier 325 is described in more detail in reference to FIG. 5. Image receiver 310 receives video from a camera, such as camera 110 of FIGS. 1 and 2. The video from the camera can be digital or analog, but will in general be analog. The image receiver 310 acts to coordinate retrieval of video from the camera and to couple the video to the image processor 315. Image processor 315 performs any needed image processing, such as Analog to Digital (A/D) conversion, quantization, and data clustering. Data clustering is described in more detail in reference to FIG. 5. Additionally, the image processor 315 can assemble frames of images from the video. The image interpreter 320 interprets these frames of images, including speed of motions on the frames. Techniques for image processing and interpretation are described in more detail in "Apparatus and Method for User Recognition Employing Behavioral Passwords," Attorney Docket No. YO998-033, filed on May 15, 1998, assigned Ser. No. 09/079,754, the disclosure of which is incorporated herein by reference.

Output of the image processor 315 is usually a series of clusters, each cluster comprising a range of movements. Each cluster in the series of clusters might comprise, for instance, the following: "the left hand moved upward"; "the right foot moved outward"; "the body was stationary over the previous period"; "the left and the right hand moved upward over the time period of 90 frames"; "the entire body moved to the right over the time period of 60 frames." Similar movements, as described below, are placed into a cluster. Thus, even though the cluster contains the label of "the left hand moved upward," the movements placed into the cluster will have a certain similarity to this base movement but will likely not exactly match the base movement. The image interpreter 320 then takes these clusters and, from them, determines classes. This is discussed in more detail in reference to FIG. 5. The class output for the previous examples could be the following: "left hand upward"; "right foot outward"; "no class"; and "both hands upward with low intensity." The class output of image interpreter 320 can comprise both movement and duration or speed of movements. Optionally, output of the image interpreter 320 can also comprise simple movement commands, such as "move right" or "move up." These output schemes are described in more detail in reference to the movement classifier 325 and FIG. 5.

Figure 4:
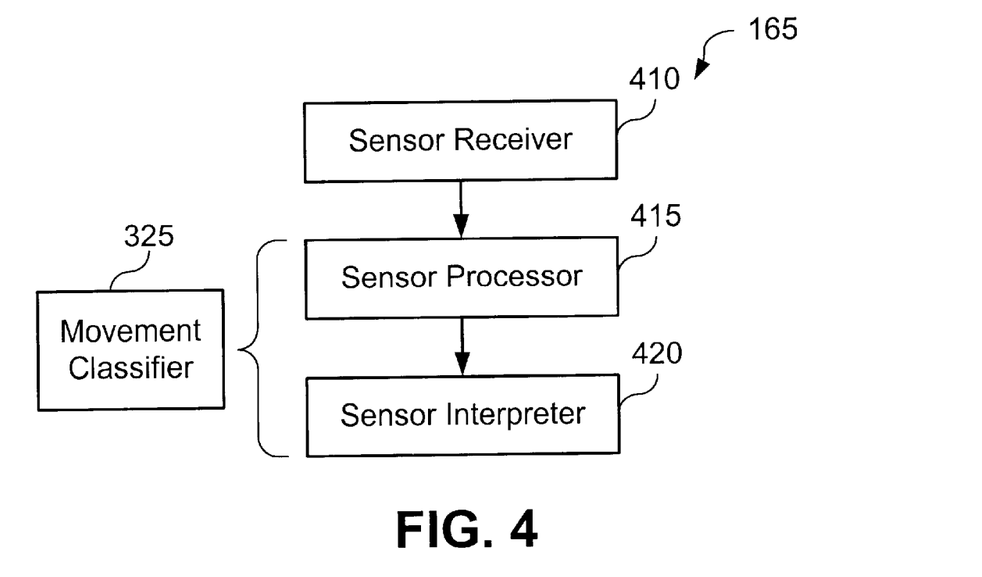
FIG. 4 shows a block diagram of an exemplary sensor movement converter, in accordance with one embodiment of the present invention.

Turning now to FIG. 4, an exemplary sensor movement converter 165 is shown, in accordance with one embodiment of the present invention. Sensor movement converter 165 comprises a sensor receiver 410, a sensor processor 415, and a sensor interpreter 420. Sensor processor 415 and sensor interpreter 420 are another embodiment of a movement classifier 325. Sensor receiver 410 is any device able to receiver a sensor reading (not shown). A heart rate sensor, for instance, can be used to transmit data to a sensor receiver 410 through Radio Frequency (RF) transmission. There are a variety of different types of sensors and sensor receivers 410 that may be used. An overview of motion sensing is given by Furniss, "Motion Capture," Media In Transition, MIT (October 1999), the disclosure of which is incorporated herein by reference. Motion capture, in general, can be mechanical, optical, or magnetic. Optical motion capture uses cameras and can be used in the system of FIG. 3. Sensors for mechanical and magnetic systems are generally joint sensors (usually placed on a metal skeleton that the person wears) and magnetic receivers, respectively. A summary of sensing technologies for tracking person movement is made in Mulder, "Person movement tracking technology," Technical Report 94-1, School of Kinesiology, Simon Fraser University (July 1994), the disclosure of which is incorporated herein by reference.

Any sensor and motion capturing system suitable for capturing the movements of a person may be used in the embodiments of the present invention that use sensors.

Sensor processor 415 is similar to image processor 315, except the sensor processor 415 operates on sensor data as opposed to image data. Sensor processor 415 converts sensor data into information suitable to be used by sensor interpreter 420. Sensor processor 415 can comprise an A/D converter, which can convert, for example, an RF signal of a heart rate monitor into a digital representation of a heart rate, along with potentially a time stamp to indicate over what duration the heart rate was taken. As another example, a joint sensor can be a piezoresistive flex sensor, which essentially is a strain gauge sensing system where resistance fluctuates. The change in resistance may be measured by a corresponding change in current, and the current can be digitized and quantized by sensor processor 415. Additionally, sensor processor 415 could use the quantized current to determine joint motion and therefore couple the joint motion information to the sensor interpreter 420. Those skilled in the art will realize that there are a large variety of different sensors and sensor outputs suitable for tracking person movement. The latter two examples are a small sampling of many different sensors. Additionally, sensor processor 415 determines clusters from movements.

Sensor interpreter 420 acts on data from the sensor processor 415 to determine classes. For instance, a sensor attached to a left hand might move upward from an initial starting location to an ending location in several seconds. Sensor processor 415 would then determine that this sensor moved as such and that this sensor is attached to the left hand. Sensor processor 415 would then determine a cluster from this data. The sensor interpreter then uses this cluster of data to determine a class or some classes. Output of the sensor interpreter 415 includes a series of classes, which correspond to certain movements. With the previous example, a cluster might be "the left hand moved upward from a starting location to an ending location." The class output could be "left hand up" and "medium intensity/speed." Additional clusters might comprise, for instance, the following: "the left and right hands moved upward"; "the right foot moved outward"; and "the body moved upward and then back downward." Class outputs corresponding to these might be the following: "both hands up"; "right leg up/down with low intensity"; and "body up/down with high intensity." Clusters and classes are explained in more detail below.

Figure 5:
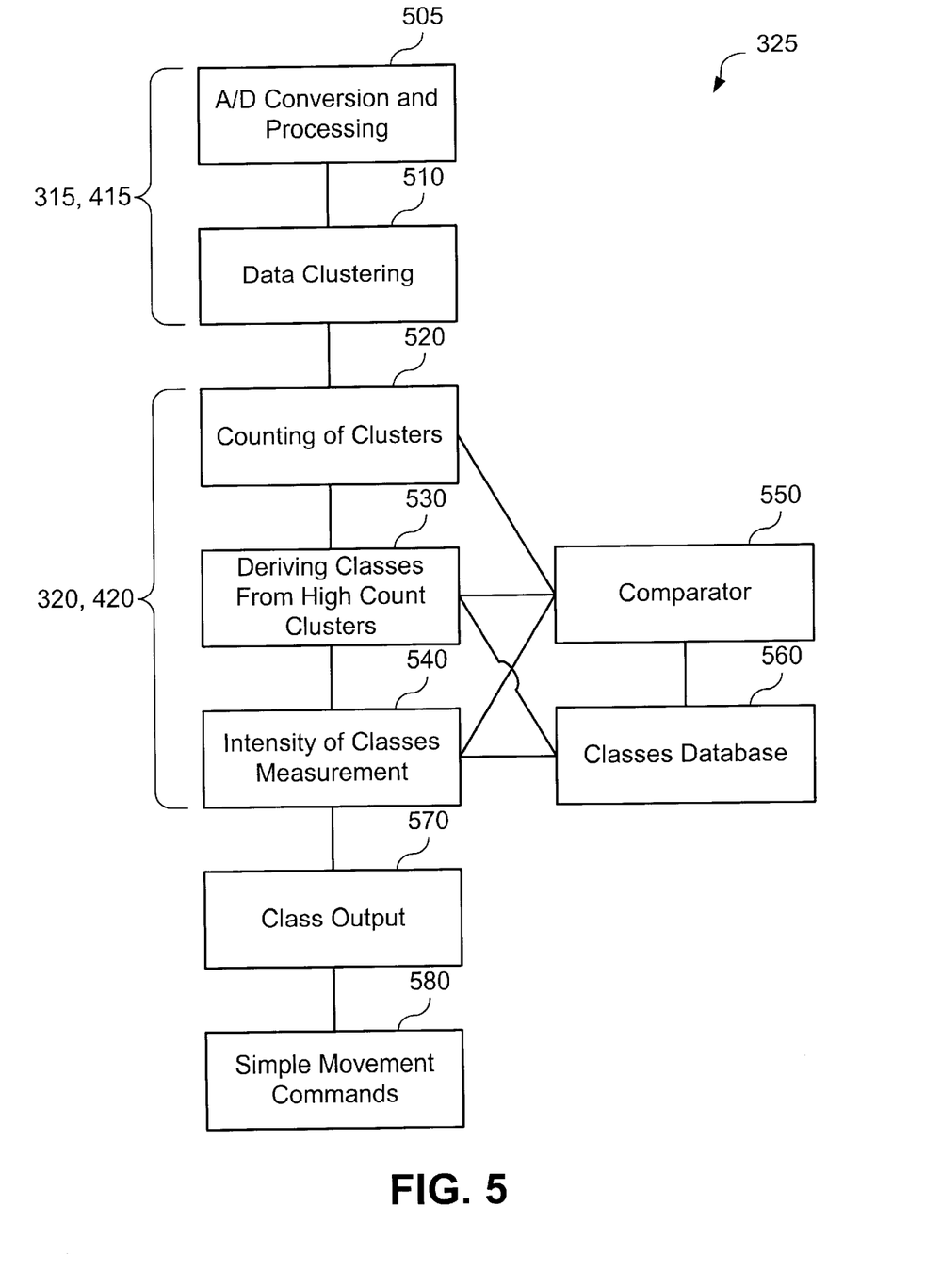
FIG. 5 shows a block diagram of a movement classifier in accordance with one embodiment of the present invention.

An exemplary movement classifier 325 is shown in FIG. 5. Movement classifier 325 comprises data clustering module 510, counting of clusters module 520, deriving classes module 530, intensity of classes measurement 540, comparator 550, and classes database 560. The A/D converter 415 is optional but is used to convert analog sensor signals to digital, as digital is easier to use when interpreting movements. Data clustering 510 puts similar movements into the same cluster. For example, hand up and down movements should be relatively similar. Every time a person moves his or her hand up or down, he or she does this movement a bit differently, but these movements are still similar and can be placed into similar clusters. Consequently, data clustering 510 places similar movements into clusters of movements. After the data has been clustered, counting of clusters module 520 calculates how often these clusters are used. For instance, the following clusters could be counted: hand up; hand down; leg up; leg down; leg bend; and body bend. Counting of clusters module 520 counts how many times a person did any particular cluster, which helps when mapping clusters to game controller commands, as described in reference to FIG. 6.

Module 530 derives classes from clusters. Techniques for deriving clusters and classes from movements is described in application Ser. No. 09/079,754, which has been incorporated by reference above. Clusters with high counts can be made into classes. As previously discussed, a cluster is essentially a range of similar movements. Similar movements are assigned the same cluster. Classes are derived from clusters and have associated with them essentially a likelihood that a particular cluster occurs. In one embodiment of the present invention, high likelihood clusters are placed into classes. Consequently, clusters are techniques for separating movement into groups and classes are techniques for selecting which groups of movements are important. It should be noted that classes may correspond to multiple clusters. Illustratively, it may take a "left foot up" cluster and a "left foot down" cluster to be assigned to a particular class, the "left foot up and then down" class. In another embodiment of the present invention, well known clusters are chosen as classes, regardless of their frequency of occurrence. For example, moving the left hand from the side to shoulder height may be associated with the "left hand extended" class, even though no data on the frequency of occurrence for this movement have been taken.

Figure 6:
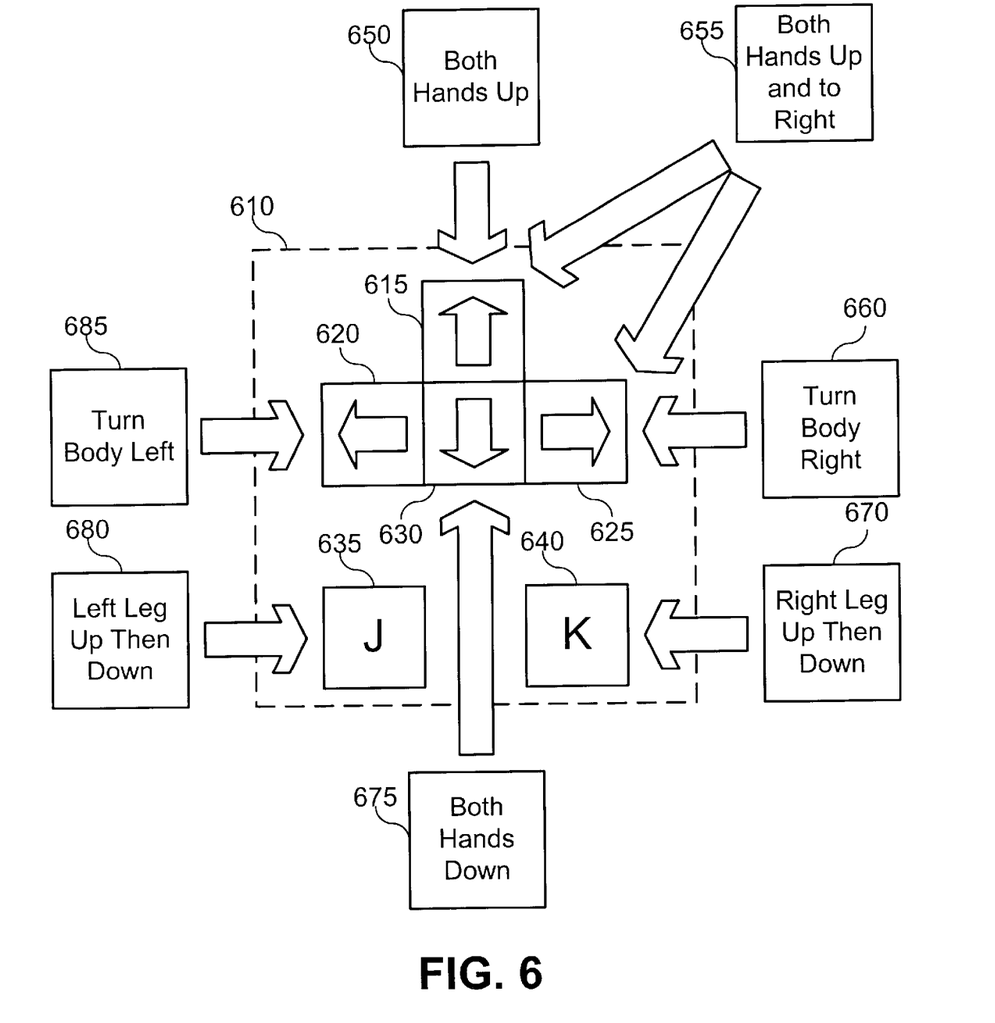
FIG. 6 shows an exemplary mapping of classes to keystrokes, in accordance with one embodiment of the present invention.

The classes are then mapped to game controller commands, as described in more detail in reference to FIG. 6. Another way to determine classes from clustered data is to use comparator 550. Comparator 550 is described in more detail below. Comparator 550 and module 540 (described below) use the optional database of classes 560. If desired, the database 560 can be located in a computer system that is remote from the system using the database. For example, in FIG. 1, the videogame interface 150 can use the classes database 560. The classes database 560 could be located elsewhere and videogame interface 150 connected to the database 560 through a network connection. In that case, movement classifier 325 can get data from the Internet, for example. The database 560 can then comprise classes of movements of multiple users. The database 560 can also be located locally, and optionally in compressed form.

Module 540 measures or determines the intensity of class movement. For instance, the same movement of lifting a left hand may be performed slowly or quickly. Depending on how this movement is mapped to a game controller command, there may be a need to determine how fast the movement was performed. For instance, in a car race game, moving a hand upward quickly might cause the brakes to be applied more forcefully than would moving the same hand upward slowly.

Comparator 550 compares known classes of movements with those clusters that were just observed. A similar process can be performed in module 530, which would then use the data solely from module 520. In the latter case, the clusters that occur most often are defined as classes. The classes are stored in classes database 560.

Comparator 550 allows currently stored classes to be more easily compared with clusters of movements as the movements occur. The comparator 550 and database of classes 560 allow quick determination of clusters. By contrast, using a count of the number of times a cluster occurs takes longer to determine classes. Additionally, the comparator 550 can use information unrelated to the number of times a cluster occurs. For example, prototypes of human movement may be stored in classes database 560. A prototype is an exemplary human movement, such as a movement of a person having both hands upward and whose body is leaning to the left. Even though this movement may not occur in sufficient clusters to create a class, the class itself can be created through a prototype of human movement.

The output of the movement classifier 325 is a sequence of classes 570. These are shown and discussed in more detail in reference to FIG. 6 below. Optionally, the classes may be converted to simple movement commands 580. Simple movement commands 580 are such commands as "move left," "faster," "slower," and "move up." These simple movement commands may or may not map to game controller commands.

Referring now to FIG. 6, an exemplary mapping of classes to keystrokes is shown, in accordance with one embodiment of the present invention. FIG. 6 illustrates six classes 650, 655, 660, 670, 675, 580, and 685. Each class is mapped to one or more game controller commands 610, which in this example are keystrokes 615, 620, 625, 630, 635, and 640. The term "commands," as used herein, refers to both the function of a game controller and a signal corresponding to the function. For instance, a keyboard will contain a letter "j." Pushing this key will result in a particular signal being sent to a computer system. Both the letter "j" and the signal that corresponds to this letter are game controller commands. It should be noted that a capital "J" and a lowercase "j" are different commands.

If a person holds both hands up, this movement is placed into class 650 ("both hands up"). It should be noted that movements close to this movement will also generally be placed into class 650. For instance, a child might move one hand all the way up, but leave the other hand partially down. Depending on the clusters into which this movement is placed, this movement will likely be placed into class 650 even though it is only a partial realization of the cluster and class movement. Class 650 is, in this example, associated with keystroke 615, the "up arrow" key of a keyboard.

This mapping from classes to game controller commands is generally performed by a game controller emulator. Optionally, the sensor or image movement converters may perform a simple version of this mapping, such as by producing simple movement commands, as described above. However, the game controller emulator will generally still create the actual game controller commands. Additionally, the representation of the actual game controller command usually depends on where the game controller emulator resides, the operating system of the computer system, and the hardware configuration of the computer system.

For instance, in the system 100 of FIG. 1, the game controller emulator could take class 650 and create a signal that corresponds to keystroke 615. Generally, this is a hexadecimal code that indicates the keystroke 615. In the system of FIG. 2, the game controller emulator could take class 650 and create an UP_ARROW keystroke that is passed directly to the videogame.

In FIG. 6, the following classes are converted to keystrokes in the following manner: class 655 (i.e., "both hands to the right") is converted to both right arrow keystroke 625 and up arrow keystroke 615; class 660 (i.e., "turn body right") is converted to right arrow keystroke 625; class 670 (i.e., "right leg up and then down") is converted to the letter "k" keystroke 640; class 675 (i.e., "both hands to the right") is converted to left arrow keystroke 625; class 655 (i.e., "both hands down") is converted to down arrow keystroke 630; class 680 (i.e., "left leg up and then down") is converted to the letter "j" keystroke 635; and class 685 (i.e., "turn body left") is converted to left arrow keystroke 620.

Figure 7:
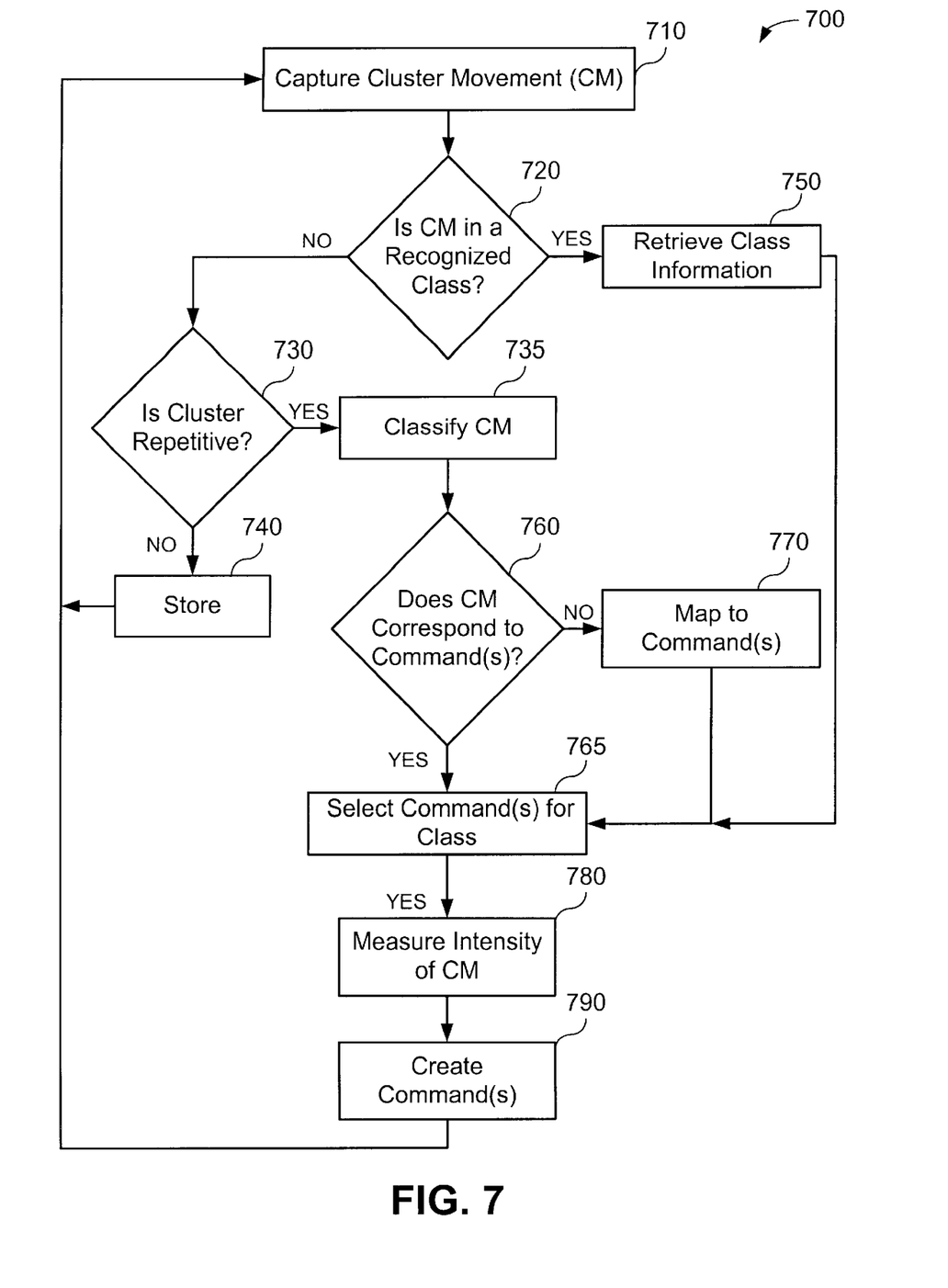
FIG. 7 is a flowchart of a method for using existing videogames for physical training and rehabilitation, in accordance with embodiments of the present invention.

Referring to FIG. 7, a method 700 is shown for using existing videogames for physical training and rehabilitation, in accordance with embodiments of the present invention. Method 700 is performed by a system, such as systems 130 or 150, to convert movements into game controller commands.

In step 710, the cluster movement is captured. The movement is captured through video or sensor techniques, as discussed above. In step 720, it is determined if the cluster movement is in a recognized class. This step generally involves comparing the cluster movement with classes of movements. Generally, each cluster and each class corresponds to a range of movements that are similar to a base movement. For example, a hand that is away from the body a predetermined distance could be considered to be fully extended for both a cluster and a corresponding class. If the cluster movement is not in a recognized class (step 720=NO), it is determined if the cluster movement is repetitive in step 730. By "repetitive," it is meant that the cluster movement has been previously seen a predetermined number of times. If the cluster movement is not repetitive (step 730=NO), it is stored (step 740) in a database of classes. Step 730 helps to limit the amount of extraneous or small movements that are made into classes.

If the cluster movement is repetitive (step 730=YES), the cluster movement is classified in step 735. Step 735 allows additional classes to be created. In step 760, it is determined if the cluster movement corresponds to one or more commands. Some movements naturally correspond to certain commands. For example, moving a hand or both hands to the left naturally corresponds to commands to commands to move to the left. Step 760 determines if the cluster movement has some natural mapping into one or more commands. Additionally, a system could be programmed to only allow certain movements to be associated with certain commands. Furthermore, there could already be movements associated with certain commands. In these cases, the current cluster movement might not be allowed to be mapped to these preexisting commands, and step 760 can optionally determine the latter two conditions. Alternatively, more than one class may be mapped to the same command, if desired. If the cluster movement does not correspond to a command or commands (step 760=NO), the cluster movement is mapped to one or more commands. Illustratively, if all possible classes are associated with classes, then the new class created in step 735 may be disposed of or, alternatively, still mapped to a command.

In step 780, the intensity of the cluster movement is measured. Step 780 may be reached if the cluster movement is in a recognized class (step 720=YES) and class information is retrieved (step 750). Class information generally includes the appropriate command or commands to which the class corresponds. Step 780 may also be reached if step 770 has been performed or if the cluster movement corresponds to one or more commands (step 760=YES), whereupon the commands are selected (step 765). The intensity of the cluster movement is measured by comparing speed of movement for video, by measuring sensors and deriving movement speed therefrom, or through other techniques known to those skilled in the art.

In step 790, the command or commands are created and sent to the appropriate device. Method 700 then continues with step 700.

It is to be understood that the embodiments and variations shown and described herein are merely illustrative of the principles of this invention and that various modifications may be implemented by those skilled in the art without departing from the scope and spirit of the invention.

What is claimed is:

1. A method for using a videogame for physical training and rehabilitation, the method comprising the steps of:

identifying at least one new type of movement of a person that is not a currently recognized movement;

mapping the at least one new type of movement of a person into at least one game controller command; and communicating the game controller command to the videogame.

2. The method of claim 1, wherein the step of identifying further comprises the steps of:

capturing video of the person; and determining a cluster movement, corresponding to the at least one new type of movement, by examining the video.

3. The method of claim 1, wherein the step of identifying further comprises the steps of:

gathering sensor data from at least one sensor attached to the person; and determining a cluster movement, corresponding to the at least one new type of movement, by examining the sensor data.

4. The method of claim 1, wherein the step of mapping further comprises the steps of:

determining at least one cluster from the information corresponding to the at least one movement of the person, wherein the cluster corresponds to a particular range of movements of a the person;

comparing the at least one cluster to one of a plurality of classes to determine if the cluster belongs to one of the classes, wherein each class corresponds to a second range of movements of a person that have a predetermined importance;

assigning the cluster to a new one of the classes when a comparison between the cluster and the one class meets predetermined criteria; and determining the at least one game controller command based on the new class.

5. The method of claim 4, further comprising the step of assigning the class to the at least one game controller command.

6. The method of claim 4, wherein the step of comparing the cluster further comprises the step of determining the predetermined importance by determining how often the cluster occurs.

7. The method of claim 4, wherein the step of comparing the cluster further comprises the step of determining the predetermined importance by assigning the predetermined importance to a class.

8. The method of claim 4, further comprising the step of determining an intensity of the one class.

9. The method of claim 1, wherein the step of communicating further comprises the step of communicating the at least one game controller command to a computer system, wherein the computer system provides the at least one game controller command to the videogame.

10. The method of claim 1, wherein the step of communicating further comprises the step of providing the at least one game controller command to the videogame.

11. A method for using a videogame for physical training and rehabilitation, the method comprising the steps of:

identifying at least one new type of movement of a person that is not a currently recognized movement;

associating the at least one new type of movement of a person with at least one cluster, each cluster corresponding to a range of movements of a person;

associating the at least one cluster with a new one of a plurality of classes, each class corresponding to a cluster of movements of the person that has a predetermined importance and that correspond to recognized movements of the person;

associating the new class with at least one game controller command; and communicating the game controller command to the videogame.

12. A system for using a videogame for physical training and rehabilitation, the system comprising:
a computer system comprising:
a memory that stores computer-readable code; and
a processor operatively coupled to the memory, the processor configured to implement the computer-readable code, the computer-readable code configured to:
identify at least one new type of movement of a person that is not a currently recognized movement;
map the at least one new type of movement of a person into at least one game controller command; and
communicate the game controller command to the videogame.

13. A system for using a videogame for physical training and rehabilitation, the system comprising:
a first computer system comprising:
a first memory that stores first computer-readable code; and
a first processor operatively coupled to the first memory, the first processor configured to implement the first computer-readable code, the first computer-readable code configured to:
accept game controller commands from a game controller; provide game controller commands to the videogame; and execute the videogame; and
a second computer system coupled to the first computer system and comprising:
a second memory that stores second computer-readable code; and
a second processor operatively coupled to the second memory, the second processor configured to implement the second computer-readable code, the second computer-readable code configured to:
identify at least one new type of movement of a person that is not a currently recognized movement;
map the at least one new type of movement of a person into at least one game controller command; and
communicate the game controller command to the first computer system.

14. The system of claim 13, further comprising at least one video camera, the second computer system coupled to the at least one video camera, and wherein the second computer-readable code is further configured, when gathering information, to:
capture video, from the at least one video camera, of the person; and
determine a cluster movement, corresponding to the at least one new type of movement, by examining the video.

15. The system of claim 13, wherein the second computer comprises two modes, wherein in the first mode the second computer-readable code is configured to gather, map, and communicate, and wherein in the second mode the second computer-readable code is configured to pass game controller commands from a game controller to the first computer system, wherein the game controller commands are passed unaltered.

16. The system of claim 13, further comprising at least one sensor attached to the person, the second computer system coupled to the at least one sensor, and wherein the second computer-readable code is further configured, when gathering information, to:
gather sensor data from the at least one sensor; and
determine a cluster movement, corresponding to the at least one new type of movement, by examining the sensor data.

17. The system of claim 13, further comprising a database of classes, and wherein the second computer-readable code is further configured, when mapping, to:
determine at least one cluster from the information corresponding to the at least one movement of the person, wherein the cluster corresponds to a particular range of movements of the person;
compare the at least one cluster to one of a plurality of classes in the database of classes to determine if the cluster belongs to one of the classes, wherein each class corresponds to a second range of movements of a person that have a predetermined importance;
assign the cluster to a new one of the classes when a comparison between the cluster and the one class meets predetermined criteria; and
determine the at least one game controller command based on the new class.

18. An article of manufacture comprising:
a computer readable medium having computer-readable code means embodied thereon, the computer-readable program code means comprising:
a step to identify at Least one new type of movement of a person that is not a currently recognized movement;
a step to map the at least one new type of movement of a person into at least one game controller command; and
a step to communicate the game controller command to a videogame.

* * * * *

UNITED STATES PATENT AND TRADEMARK OFFICE
CERTIFICATE OF CORRECTION

PATENT NO. : 6,712,692 B2
DATED : March 30, 2004
INVENTOR(S) : Basson et al.

It is certified that error appears in the above-identified patent and that said Letters Patent is hereby corrected as shown below:

Column 10,
Line 28, before "information" and after "from" delete "the".
Line 31, before "the person" and after "movements of" delete "a".

Column 12,
Line 31, before "information" and after "from" delete "the".
Line 51, before "one" and after "at" replace "Least" with -- least --.

Signed and Sealed this

Eleventh Day of October, 2005

JON W. DUDAS
*Director of the United States Patent and Trademark Office*